(No Model.)
M. GROSSMAYER.
BULL WHEEL FOR DRILLING RIGS.
No. 391,791. Patented Oct. 30, 1888.
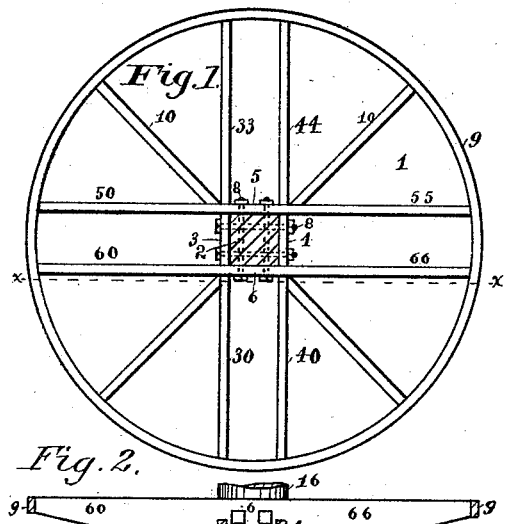
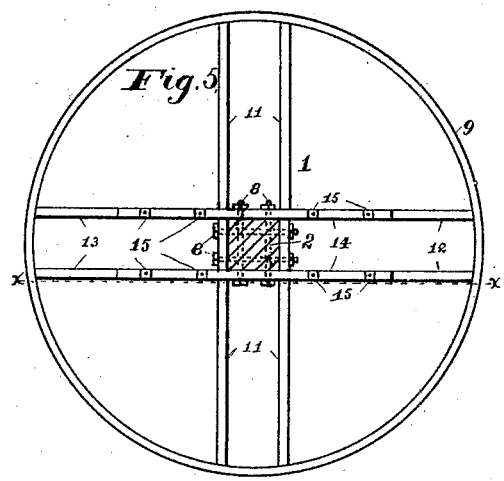
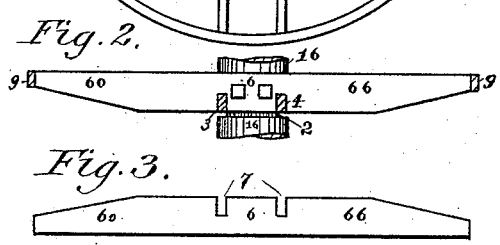
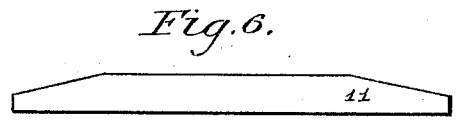
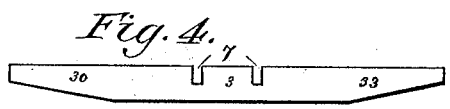
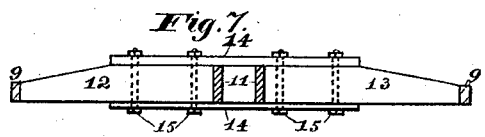
WITNESSES:
A. S. Gray.
Z. T. Wilber.
INVENTOR.
Max Grossmayer.
BY R. M. McDermott.
his
ATTORNEY.

UNITED STATES PATENT OFFICE.

MAX GROSSMAYER, OF FLORENCE, COLORADO.

BULL-WHEEL FOR DRILLING-RIGS.

SPECIFICATION forming part of Letters Patent No. 391,791, dated October 30, 1888.

Application filed January 30, 1888. Serial No. 262,376. (No model.)

*To all whom it may concern:*

Be it known that I, MAX GROSSMAYER, a citizen of the United States of America, residing at Florence, in the county of Fremont and State of Colorado, have invented certain new and useful Improvements in Bull-Wheels for Drilling-Rigs, of which the following is a specification, reference being had therein to the accompanying drawings.

My invention relates to what are termed the "bull-wheels" placed and used in "drilling-rigs" on the axle, upon which is wound the rope sustaining the drilling-tools. Such wheels are ordinarily of quite large diameter, (usually seven to eight feet,) and as the power to rotate them and the axles upon which they are seated is applied at or upon the rim of the wheels a great leverage and strain is put upon the unions or fastenings of the wheels to the axles, wherefore it is necessary that such union or fastening should be as firm, strong, and solid as possible. In addition, when it is desired to have the drilling-rig constructed so as to be readily moved from place to place, it is desirable that these wheels, as well as other parts of the rig, should be of the "knockdown" variety—that is, adapted to be readily taken apart and as readily reassembled and put into operative position and condition.

In the construction of such wheels several plans have hitherto generally been followed. In the one more commonly used the shaft or axle at the seating-point of a wheel has been made hexagonal or octagonal, and upon each face so formed an inner end of an arm was secured, all the arms projecting equally from the axle upon their extremities, the rim or band of the wheel being seated. This construction affords but a comparatively small seating-space for securing an arm upon the axle, rendering it difficult to attach the arms firmly, reliably, and solidly enough to withstand the great strain to which the wheel is often subjected. In another construction, very often used and known as the "Corbett Patent Wheel," the axle is squared at a point adjacent to the seat of the wheel, and four short arms are secured upon the faces of the squared portion. The wheel is formed of a rim with two parallel planks or boards a short distance apart extending almost diametrically the wheel, the rim being secured on the ends thereof. On either side of such two parallel planks two arms, likewise parallel and the same distance apart, extend from the parallel plank to the rim, being secured to both. The wheel so constructed is slipped upon the shaft or axle and surrounds a regular or round portion thereof, it being secured to the shaft or axle by the bolting of its arms to the four short arms attached to the squared portion of the shaft or axle—that is, the wheel is intermediately, not directly, attached to or upon the shaft or axle. Such construction does not always give as firm and steady a seat for the wheel as is desirable, and it is complicated and somewhat expensive, in that it requires the use of double sets of arms, one set in the wheel proper and one set upon the shaft.

In view of these things, the object of my invention is to furnish a bull-wheel, of simple construction and few parts, adapted to take upon the axle with the greatest possible amount of bearing-surface, and to be as firmly, rigidly, and reliably secured thereto as the nature and strength of the materials used will permit; to which ends it consists in the features and combinations more particularly hereinafter described and claimed.

Referring now to the accompanying drawings for an illustration of my invention, Figure 1 thereof is an elevation of a bull-wheel embodying my invention; Fig. 2, a section thereof on the line *x x*, Fig. 1; Fig. 3, a plan view of one of the pieces for forming the arms or spokes of the wheel; Fig. 4, the same of the other of such pieces; Fig. 5, an elevation of another embodiment or a modification; Fig. 6, a plan view of one of the pieces forming arms or spokes in Fig. 5; Fig. 7, a section on line *x x*, Fig. 5.

In the figures the reference-numeral 1 indicates the bull-wheel proper, seated on the squared part 2 of the axle or shaft 16. It has eight regular arms or spokes—viz., 30, 40, 50, 60, 33, 44, 55, and 66—upon whose outer ends is supported the rim or periphery 9 of the wheel. Of these arms, each two lying in the same plane and on opposite sides of the shaft are formed of one plank extending continuously through both such arms. Thus the plank 4 forms the arms 40 and 44, plank 3 the arms 30 and 33, plank 5 the arms 50 and 55, and the plank 6 the arms 60 and 66. Of these planks or strips or continuous pieces, 3 and 4 are similar and parallel to each other, and are secured upon opposite faces of the squared portion 2, while 5 and 6 are similar and parallel and are secured upon the two other opposite faces of 2. As seen, 3 and 4 intersect or cross 5 and 6, to permit which each plank has notches 7 cut into it to half its width. These notches are on either side of the center longitudinally and distant therefrom half the width of the square 2, and they are of a width equal to the thickness of the intersecting plank. 3 and 4 are so notched on one side, while 5 and 6 are so notched on the other side, as seen in Figs. 3 and 4. This permits them to cross or intersect each other and yet have their edges in the same planes. They are secured to the squared portion 2 of the shaft 16 by any suitable means, which, when it is desired to construct the wheel so as to be readily taken apart and put together again, may be by the bolts 8, as shown, or by screws, or when the rig is to be permanent and stationary one may be by spikes.

If desired, false arms 10 may be used between and in addition to the regular arms for the purpose of strengthening the wheel and supporting the rim. They are secured to the regular arms at or near their points of intersection and to the rim or band.

In the modification shown in Fig. 5 the four arms 11 11 11 11 are formed of two straight unnotched planks, strips, or timbers extending across the wheel, each forming two arms. The arms 12 12 13 13, at right angles thereto, are formed of planks or pieces extending from the main pieces 11 to the rim of the wheel, one arm 12 and one arm 13 lying in the same plane and being a distance apart equal to the square face of the shaft + the thickness of two cross-arms 11, and they are secured together by splices 14, extending from one to the other and secured upon either edge thereof by bolts, screws, or spikes, bolts 15 being here shown to represent any suitable fastening devices. This in effect makes one continuous piece of 12 and 13, with a central aperture to pass over the other pieces and arms, 11, instead of using the notches therefor, as in the other instance. The splices 14 are secured to the squared portion of the shaft in the same manner as are the other arms—that is, by bolts, screws, or spikes, as may be deemed most desirable or convenient.

In both these embodiments of the invention the greatest strength consistent with the material used is secured; or, in other words, the natural strength of the material used is fully utilized for solidity and rigidity, inasmuch as every arm is seated upon the shaft for the full width of the square face. As the arms are practically continuous from side to side or across the wheel and on either side of the shaft, the arms opposite each other being practically each a continuation of the other, they mutually aid and strengthen each other in maintaining a firm solid bearing upon the shaft. A minimum of material is required, strength and solidity being considered, and the wheel may, if bolts be used, be readily taken apart, and the components as readily reassembled.

Having thus described my invention, what I claim is—

The combination of a shaft having a squared portion for a wheel-seat, planks or strips crossing each other, so that their edges lie in the same plane, and secured upon the squared portion of the shaft, each plank or strip forming an arm on each side of its seat on the squared portion of the shaft, and a rim or web, 9, secured directly upon the ends of the arms, substantially as set forth.

In testimony whereof I affix my signature in presence of two witnesses.

MAX GROSSMAYER.

Witnesses:
Z. F. WILBER,
B. L. POLLOCK.